UNITED STATES PATENT OFFICE.

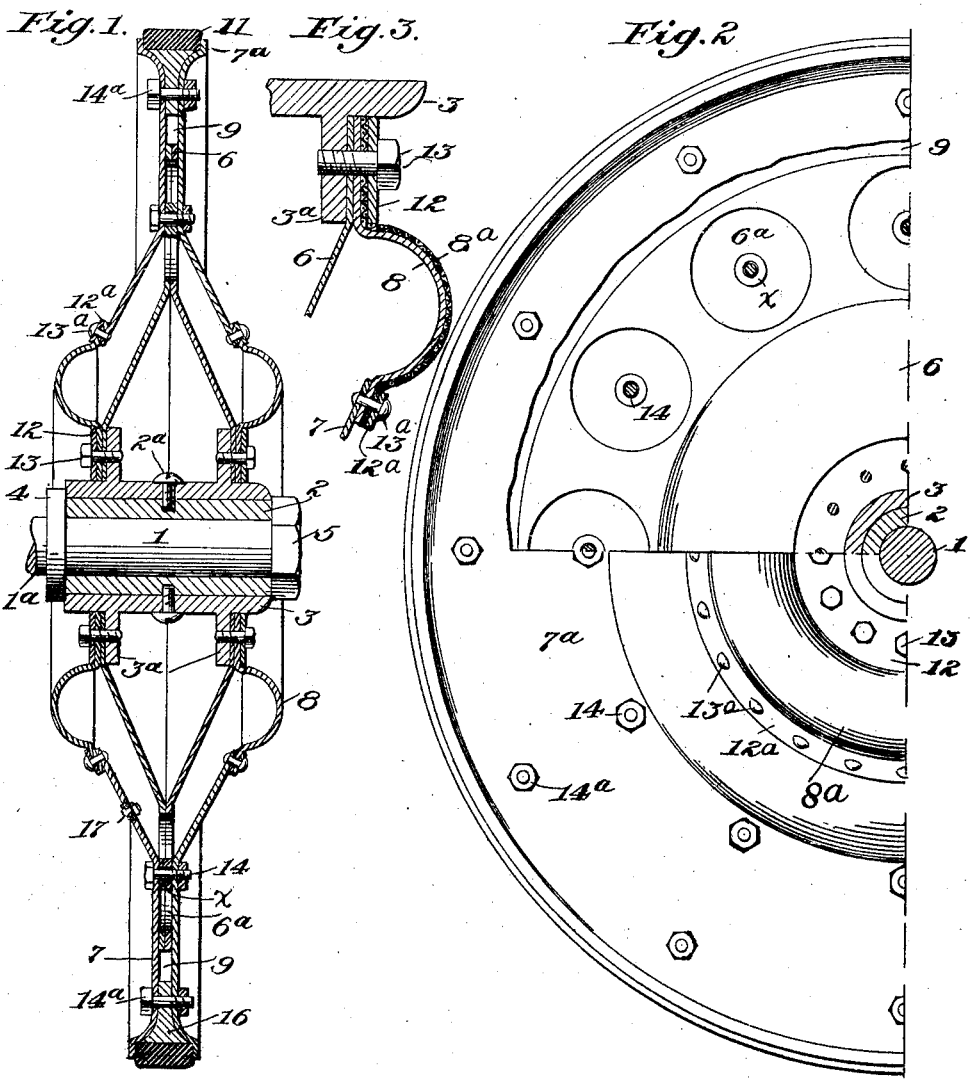

HENRY EDWARD MOEBUS, OF BOSTON, MASSACHUSETTS, ASSIGNOR TO HOWARD W. BROWN, TRUSTEE, OF BROOKLINE, MASSACHUSETTS.

RESILIENT WHEEL.

976,591. Specification of Letters Patent. Patented Nov. 22, 1910.

Application filed May 3, 1909, Serial No. 493,734. Renewed April 21, 1910. Serial No. 556,811.

*To all whom it may concern:*

Be it known that I, HENRY EDWARD MOEBUS, a citizen of the United States of America, and a resident of Boston, in the county of Suffolk and State of Massachusetts, have invented certain new and useful Improvements in Resilient Wheels, of which the following is a specification.

This invention relates to vehicle wheels and has for its object the production of a wheel having a high resiliency and one which will give a desirable elasticity when in operation, thus dispensing with the necessity of using a pneumatic tire.

The invention consists in certain novel features of construction and arrangement of parts which will be readily understood by reference to the description of the drawings and to the claims hereinafter given.

Of the drawings: Figure 1 represents a vertical section of a wheel embodying the features of the present invention. Fig. 2 represents an elevation of a half of the same, a portion of the outer plate being broken away and the hub and axle on which the hub turns being shown in section, and Fig. 3 represents an enlarged section showing a detail of construction to be hereinafter referred to.

Similar characters designate like parts throughout the several figures of the drawings.

In the drawings, 1 represents a spindle at one end of the usual axle $1^a$. The spindle 1 is surrounded by a sleeve 2 which in turn is inclosed within another sleeve 3 secured to the sleeve 2 by means of screws $2^a$, the two sleeves thus secured together forming the wheel hub.

The axle $1^a$ is provided with a cylindrical flange 4 against the outer face of which the hub 3 is retained by means of the usual nut 5. The outer sleeve 3 of the hub is provided with two cylindrical flanges $3^a$, the faces of which are parallel with one another and separated. To the outer face of each of these flanges $3^a$ is secured an annular plate 6, each plate having a conical central portion while the outer portion of these plates 6 are parallel with one another and in contact as plainly shown in Fig. 1 of the drawings. On each side of this pair of plates 6 are the annular disks 7—$7^a$. The central portion of these disks 7—$7^a$ flare outwardly from each other and have secured thereto semi-cylindrical resilient members 8 re-inforced by a covering $8^a$ of wire mesh or some similar flexible material capable of fully protecting the resilient member 8, which, owing to the protection it receives by means of said covering $8^a$, may be of rubber or some similar impermeable material. This covering $8^a$ may be of wire mesh or any suitable material which will prevent the inner resilient member from being punctured or otherwise injured. The outer portions of the disks 7—$7^a$ are separated sufficiently to provide a chamber 9 in which the contacting portions of the central plates 6 fit and are adapted to move radially in the operation of the wheel independent of the annular disks 7—$7^a$.

The extreme outer edges of the annular disks 7—$7^a$ are curved outwardly to receive a tire 11 of rubber or any other suitable material, said tire extending beyond the periphery of said disks. The inner edges of the resilient members 8 and their protecting coverings $8^a$ are secured against the inner edges of the plates 6 and all clamped together against the flanges $3^a$ by means of the annular plates 12 and the bolts 13 passing through said resilient member 8, its covering $8^a$, the plate 6, and the flange $3^a$ to the latter of which it is threaded. The opposite edges of the resilient members 8 and their coverings $8^a$ are secured to the inner edge of the annular disks 7—$7^a$ and clamped thereto by means of the annular plates $12^a$ and the rivets $13^a$ passing through said members and locking them securely together.

The parallel portions of the annular disks 7—$7^a$ are locked together by means of the members 14 and $14^a$, the latter members passing through a filling piece 16 of wood or some similar light material and forming a suitable rim for the wheel and affording a backing for the tire 11.

Each of the members 14 normally passes through the center of a circular perforation or opening $6^a$ in the parallel portions of the central plate 6 and within the opening $6^a$ surrounding each member 14 and interposed between the annular disks 7—7ᵃ is a roller x. The central conical portions of the central plate 6 and inclosing annular disks 7—7ᵃ connected by the resilient members 8 to the sleeve 3 of the hub forms an inclosed air tight chamber into which compressed air is adapted to be forced through the valve 17.

Normally the tire 11 is concentric with the axis of the axle 1—1ᵃ and the compressed air contained within the chamber between the central plates 6 and inclosing disks 7—7ᵃ and 8 serves to retain the tire 11 in this normal position.

The annular chamber around the sleeve 3 between the central plates 6 contains air under atmospheric pressure while the chambers on the outer side of said central plates 6 are filled with compressed air which tends to force the movable parts inclosing said central plates 6 outwardly and thus retain the tire 11 in a position concentric to the axis of the axle. When, however, any pressure is brought to bear upon the wheel, as, for instance, when it receives jolts or shocks in passing over rough ground, the compressed air around the hub will be further compressed and displaced from the lower part of the wheel and forced into the upper part thereof, this action having the effect of bulging out the semi-cylindrical resilient members 8 by bringing their points of attachment to the plates 6 and the disks 7—7ᵃ closer together on the under side of the wheel while on the upper side of the wheel these semi-cylindrical resilient members will tend to flatten out in consequence of the lift the rim of the wheel will receive from the shift of air pressure from the under side of the hub to the upper portion of the chamber in which it is contained. During this action the rollers x are liable to be forced into contact with the edge of the circular openings 6ᵃ in the central plate 6 and when this occurs these rollers x are adapted to revolve about the bolt 14 to obviate any friction which there might otherwise be.

When the rough ground has been passed the compressed air within the inclosed chamber and the resiliency of the members 8 will tend to bring all of the parts back into their normal position. The center plates 6 being at right angles to the axis of the spindle 1, retain the outer part of the wheel in position and prevent its lateral shifting.

The screw bolts 14 which are situated so as to pass through the center of the holes 6ᵃ in the plate 6 thus leaving a space around them serve the double purpose of holding the plates 7—7ᵃ in their proper position while at the same time they serve as a means for enabling the disk 6 to carry the rim of the wheel along with it in its revolutions by means of the inner edges of the openings 6ᵃ contacting with the rollers x surrounding the bolts 14. It is obvious that as these bolts are normally centrally disposed through the openings 6ᵃ all around the plate 6 the rim secured to the annular disks 7—7ᵃ to which the bolts 14 are secured will be allowed a limited movement in all directions.

This provides a very simple and effective wheel having great resiliency and dispensing with the necessity of using the ordinary pneumatic tires, thus wholly overcoming any chance for punctures.

Having thus described my invention, I claim:

1. In a wheel, the combination of a hub provided with a pair of separated parallel flanges; two annular plates secured at their inner edges to said flanges, the outer portions of which contact and are provided with a plurality of openings; annular disks on the outer faces of said pair of plates; a tire supported between the outer edges of said disks; studs secured to said disks and extending through the openings in said plates; and resilient members between the inner edges of said disks and said hub flanges.

2. In a wheel, the combination of a hub provided with a pair of separated parallel flanges; two annular plates secured at their inner edges to said flanges, the outer portions of which contact and are provided with a plurality of openings; annular disks on the outer faces of said pair of plates; a tire supported between the outer edges of said disks; studs secured to said disks and extending through the openings in said plates; resilient members between the inner edges of said disks and said hub flanges; and a flexible woven wire protector covering the outer face of said resilient members.

3. In a wheel, the combination of a hub provided with a pair of separated parallel flanges; two annular plates secured at their inner edges to said flanges, the outer portions of which contact and are provided with a plurality of openings; annular disks on the outer faces of said pair of plates and separated therefrom to form an inclosed chamber adapted to contain compressed air; a tire supported between the outer edges of said disks; studs secured to said disks and extending through the openings in said plates; and resilient members between the inner edges of said disks and said hub flanges.

4. In a wheel, the combination of a hub provided with a pair of separated parallel flanges; two annular plates the central portions of which are conical and secured at their inner edges to said flanges while the outer portions of which contact and are provided with a plurality of openings; annular disks on the outer faces of said pair of plates; a tire supported between the outer edges of said disks; studs secured to said disks and extending through the openings in said plates; and resilient members between the inner edges of said disks and said hub flanges.

5. In a wheel, the combination of a hub provided with a pair of separated parallel flanges; two annular plates the central portions of which are conical and secured at their inner edges to said flanges while the outer portions of which contact and are provided with a plurality of openings; annular disks on the outer faces of said pair of plates, the inner portions of which are conical and substantially parallel with but separated from the conical portions of said plates thereby forming chambers for compressed air; a tire supported between the outer edges of said disks; studs secured to said disks and extending through the openings in said plates; and resilient members between the inner edges of said disks and said hub flanges.

6. In a wheel, the combination of a hub provided with a pair of separated parallel flanges; two annular plates secured at their inner edges to said flanges, the outer portions of which contact and are provided with a plurality of openings therethrough while the inner portions are conical from the edges of said flanges to the point of contact with each other; annular disks on the outer faces of said plates, having their inner portions parallel to but separated from the conical sides of said plates; resilient members secured to the inner edges of said disks and connected to said flanges thereby forming a closed chamber adapted to contain compressed air; connecting members between said disks and passing through the openings in said plates; an annular rim secured between the inner faces of said disks the diameter of which is less than that of said disks; and a tire thereon extending beyond the edges of said disks.

7. In a wheel, the combination of a hub; two central plates secured thereto; an annular metal disk on each side of said central plates, the inner edges of which are separated from said plates and also from said hub; a resilient member between the inner edges of said disks and said hub adapted to form an inclosed chamber; a tire secured to the outer edges of said annular disks; and means permitting a radial movement of said central plates independent of said annular disks.

Signed by me at 4 P. O. Sq., Boston, Mass., this 1st day of May, 1909.

HENRY EDWARD MOEBUS.

Witnesses:
    WALTER E. LOMBARD,
    NATHAN C. LOMBARD.